(12) United States Patent
Gauglitz et al.

(10) Patent No.: US 9,495,761 B2
(45) Date of Patent: Nov. 15, 2016

(54) ENVIRONMENT MAPPING WITH AUTOMATIC MOTION MODEL SELECTION

(71) Applicant: The Regents of the University of California, Oakland, CA (US)

(72) Inventors: Steffen Gauglitz, Falmouth, MA (US); Christopher Michael Sweeney, Santa Barbara, CA (US); Jonathan Daniel Ventura, Colorado Springs, CO (US); Matthew Alan Turk, Santa Barbara, CA (US); Tobias Höllerer, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/531,608

(22) Filed: Nov. 3, 2014

(65) Prior Publication Data
US 2015/0125045 A1 May 7, 2015

Related U.S. Application Data

(60) Provisional application No. 61/899,763, filed on Nov. 4, 2013.

(51) Int. Cl.
*G06K 9/00* (2006.01)
*G06T 7/20* (2006.01)
*G06T 7/00* (2006.01)

(52) U.S. Cl.
CPC ........... *G06T 7/2033* (2013.01); *G06T 7/0071* (2013.01)

(58) Field of Classification Search
CPC ... G06T 7/0071; G06T 7/2033; G06T 11/60; G06T 19/006; G06T 19/20; G06T 19/003; G06T 19/00; G06T 17/00; G06T 2200/08; G06T 17/05; G06T 7/0046; H04N 2201/3256; H04N 13/0275; G06F 3/0346; A61B 6/466; A61B 8/466; A61B 19/50; A61B 2019/502; A63B 2300/6615; G01C 21/3638

See application file for complete search history.

(56) References Cited

U.S. PATENT DOCUMENTS

| | | | | |
|---|---|---|---|---|
| 5,604,821 A * | 2/1997 | Ranganathan | ........ | G06T 7/2053 348/407.1 |
| 7,184,100 B1* | 2/2007 | Wilf | ...................... | G11B 27/28 348/700 |
| 7,702,185 B2* | 4/2010 | Keating | ............... | G06K 9/4647 382/190 |
| 8,089,563 B2* | 1/2012 | Girgensohn | ...... | G06F 17/30811 348/159 |
| 8,190,634 B2* | 5/2012 | Takao | ............... | G06F 17/30265 382/118 |
| 8,411,902 B2* | 4/2013 | Obrador | .................... | G06T 7/20 382/107 |
| 2004/0170321 A1* | 9/2004 | Gong | ............... | G06F 17/30802 382/173 |
| 2005/0094870 A1* | 5/2005 | Furukawa | ............ | H04N 19/139 382/155 |

(Continued)

*Primary Examiner* — Avinash Yentrapati
(74) *Attorney, Agent, or Firm* — Schwegman Lundberg & Woessner, P.A.

(57) ABSTRACT

Various embodiments each include at least one of systems, methods, devices, and software for environment mapping with automatic motion model selection. One embodiment in the form of a method includes receiving a video frame captured by a camera device into memory and estimating a type of motion from a previously received video frame held in memory to the received video frame. When the type of motion is the same as motion type of a current keyframe group held in memory, the method includes adding the received video frame to the current keyframe group. Conversely, when the type of motion is not the same motion type of the current keyframe group held in memory, the method includes creating a new keyframe group in memory and adding the received video frame to the new keyframe group.

17 Claims, 7 Drawing Sheets

(56) References Cited

U.S. PATENT DOCUMENTS

| | | | |
|---|---|---|---|
| 2006/0257048 A1* | 11/2006 | Lin | G06K 9/00711 382/276 |
| 2009/0141940 A1* | 6/2009 | Zhao | G06K 9/00295 382/103 |
| 2012/0002878 A1* | 1/2012 | Kuriyama | G06K 9/00221 382/195 |
| 2012/0123780 A1* | 5/2012 | Gao | G06K 9/00751 704/245 |
| 2013/0163831 A1* | 6/2013 | Tanaka | G06K 9/00926 382/118 |
| 2014/0010458 A1* | 1/2014 | Nakamura | G06F 17/30244 382/195 |
| 2014/0205158 A1* | 7/2014 | Fukazawa | G06K 9/00288 382/118 |

* cited by examiner

ENVIRONMENT MAPPING WITH AUTOMATIC MOTION MODEL SELECTION

RELATED APPLICATION AND PRIORITY CLAIM

This application is related and claims priority to U.S. Provisional Application No. 61/899,763, filed on Nov. 4, 2013 and entitled "ENVIRONMENT MAPPING WITH AUTOMATIC MOTION MODEL SELECTION", the entirety of which is incorporated herein by reference.

STATEMENT OF GOVERNMENT SPONSORED SUPPORT

The subject matter here was developed with Government support under Grant (or Contract) Nos. N00014-09-1-1113 awarded by the Office of Naval Research and U.S. Pat. No. 0,747,520 awarded by the National Science Foundation. The Government has certain rights to the subject matter herein.

FIELD

The present subject matter relates to modeling and tracking in building spatial models from camera images, and in particular to environment mapping with automatic motion model selection that have applications in many areas including augmented reality and robotics methods and systems.

BACKGROUND INFORMATION

In recent years, there has been tremendous amount of work on real-time vision-based tracking and mapping (T&M) systems. That is, systems that simultaneously determine one or both of the position and orientation of a camera with respect to a previously unknown environment and creation of a model of the viewed environment. In addition to other applications, T&M is an enabling technology for Augmented Reality (AR) in unprepared environments.

Two characteristics of a T&M system are the type of camera motion and the geometry of the environment that it supports. For example, a system may assume a planar environment or a camera that is rotating around its optical center, i.e., a panoramic capture. Simultaneous Localization and Mapping (SLAM) systems handle environments of arbitrary geometry and camera motion that induces parallax. However, SLAM systems generally do not support rotation-only camera motion. Instead, in SLAM systems the mapping is intrinsically built upon triangulation of features where each feature needs to be observed from two distinct camera locations; they produce degenerate maps or fail completely when the camera rotates from one part of the environment to another.

Therefore, most SLAM systems need to be initialized with a distinct "traveling" movement of the camera for each newly observed part of the environment, and the required travel distance is directly proportional to the distance to the environment and features therein.

DETAILED DESCRIPTION

Figure 1:
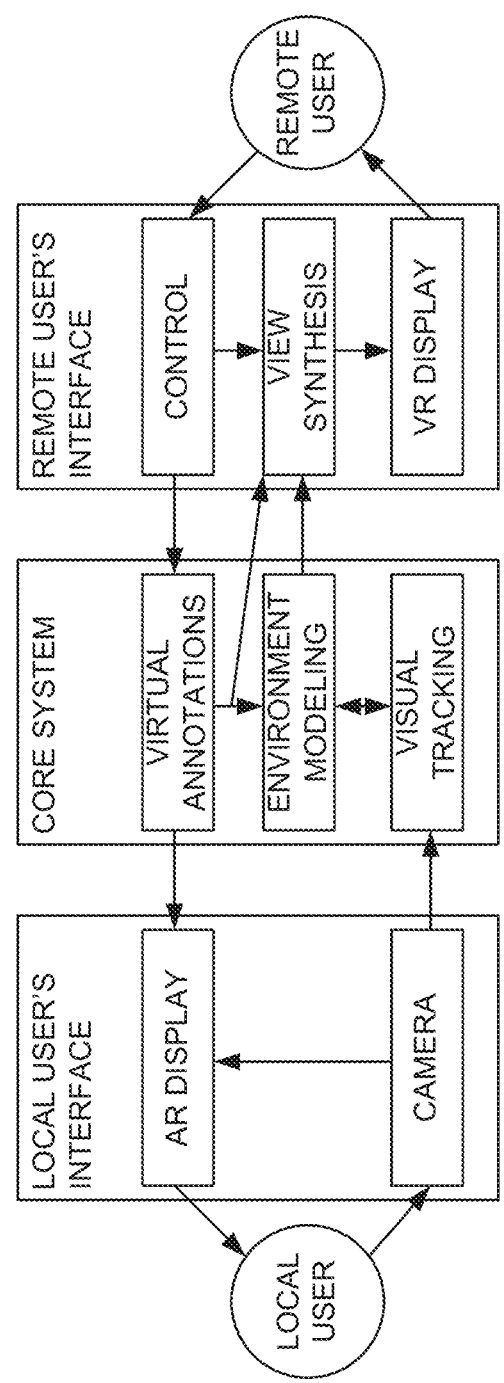
FIG. 1 is a logical block diagram of a system, according to an example embodiment.

As mentioned above in the Background Information portion, there has been tremendous amount of work on real-time monocular vision-based tracking and mapping (T&M) systems in recent years. That is, systems that simultaneously determine one or both of the position and orientation of a camera with respect to a previously unknown environment and creation of a model of the viewed environment. In addition to other applications, T&M is an enabling technology for Augmented Reality (AR) in unprepared environments.

Two characteristics of a T&M system are the type of camera motion and the geometry of the environment that it supports. For example, a system may assume a planar environment or a camera that is rotating around its optical center, i.e., a panoramic capture. Simultaneous Localization and Mapping (SLAM) systems handle environments of arbitrary geometry and camera motion that induces parallax. However, with few exceptions, SLAM systems do not support rotation-only camera motion. Instead, in SLAM systems the mapping is intrinsically built upon triangulation of features where each feature needs to be observed from two distinct camera locations; they produce degenerate maps or fail completely when the camera rotates from one part of the environment to another.

Therefore, most monocular SLAM systems need to be initialized with a distinct "traveling" movement of the camera for each newly observed part of the environment. Theoretically, systems with multiple cameras (e.g., stereo) do not require this movement; however, the baseline distance required for robust operation is directly proportional to the distance to the environment and features therein. Therefore, in practice, this movement is also required in many environments for most multi-camera systems, in particular small-sized configurations in mobile or wearable devices. This movement requirement can confound use of SLAM systems in AR, where the environment modeling is assumed to be done in the background and is ideally transparent to the user, who should not be required to move a certain way in order to make the system work. Moreover, rotation-only "looking around" is a very natural motion and may occur in many AR applications and confound successful utilization while also frustrating users due to system failures.

Various embodiments herein include T&M solutions for remote collaboration between a local user and at least one remote user, where the emerging model of the environment provides the at least one physically remote user abilities to view and navigate the environment of the local user. Some embodiments further allow for AR annotations that are registered to this model and used to communicate visual/spatial information between the local and the at least one remote user. For the application of these embodiments and embodiments of many other applications, the paradigm for modeling the environment is to make the best possible use of all data that can be casually collected and to enable viewing and placement of annotations for as much time as possible during a remote collaboration session. In particular, this means not forcing the user to concentrate on model building, and not discarding all frames that stem from rotation-only movements (as in most SLAM systems) or translations (as with panorama mapping).

In various embodiments illustrated and described herein, approaches and implementations that fulfill various criteria are presented. The criteria are more specifically real-time tracking and mapping that explicitly supports both parallax-inducing and rotation-only camera motions in 3D environments, no requirement for a separate initialization step, and continuing to collect data despite intermittent tracking loss. In the case of intermittent tracking loss, the various embodiments create several disjoint maps that are later merged if possible. Elements of some approaches herein are the use of a metric, such as the 'Geometric Robust Information Criterion' (GRIC) in combination with relative movement transitions as well as absolute pose (i.e., position and/or orientation) models to decide whether a camera motion can best be represented as a parallax-inducing motion or a rotation-only motion.

Although various embodiments are illustrated and described herein with regard to networked collaboration sessions including shared video views, the T&M solutions presented herein are also applicable for other purposes and in other scenarios. For example, the T&M solutions of the various embodiments may be equally applied to vision-based robotics, video feeds from cameras mounted to moving objects or worn by people, among other possible implementations.

As a general basis herein, the various embodiments include video captured as frames from a camera. In some T&M embodiments, tracking and mapping may be performed in two separate and asynchronous processing threads, although data from each thread may be utilized in the other.

Tracking generally refers to determining the location of the observer at the moment when an image frame was captured with regard to one or both of a previous frame and a model generated by assembly of previously captured video frames. The modeling refers to the assembly of a model, which is generally, but not necessarily, formed into a 3D model. A model is not necessarily viewed. Instead, a model provides a reference to camera position and/or orientation associated with the currently captured frame with respect to previously captured video frames included and assembled in a model. However, in some instances, a model may be viewed and navigated by local and/or remote users independently of a current camera view.

In some embodiments, the tracking is performed by capturing a current video frame or a sequence of current video frames and determining a type of motion between the current video frame or sequence of current video frames from one or more previous video frames. In some embodiments, the type of motion may be rotational or parallax and the type of motion may be determined based on a metric, such as a GRIC score, computed for each of rotational and parallax motions. Based on the metric results, a type of motion is determined. When tracking is maintained from frame to frame, the captured video frames are queued up for an independent mapping processing thread that operates to build a model based on the current track. When tracking is lost, a new track is initiated and the modeling process starts generating a new model for the new track, while maintaining previously generated models.

As part of the independent modeling process, disjointed track models are processed to identify whether the disjointed track models may be joined to form a single model, although other disjointed track models may still be present. Through such embodiments, most if not all video frames are retained and made a part of a model as opposed to SLAM and rotation-only mapping systems that discard captured video frames that do not properly track to previous frames. Instead, most existing SLAM and rotation-only mapping systems discard captured frames that do not properly track to previous frames until either tracking is reestablished or a previous track is discarded and a new track is established. The ability to start new tracks when tracking is lost and for the of the mapping processes herein to join models of disjointed tracks allows for utilizing more data and thus building more comprehensive models in a shorter period.

Further, in AR embodiments where annotations are added by one user for view by him/herself and/or other users, the annotations are added with regard to an environment model. These annotations persist even when tracking is lost and a new track model is created.

These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, a mobile device, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system, according to an example embodiment. In particular, FIG. 1 illustrates an example system framework for a particular example application that enables a remote user to explore a physical environment via live imagery from a camera that the local user holds or wears, such as a camera of a mobile device or a wearable computing device, which may be or include a networked, wearable camera. The remote user is able to interact with a model fused from images captured from the surroundings of the local user and create and add virtual annotations in it or transfer live imagery (e.g., of gestures) back. The example system is an example of a system on which various embodiments may be implemented. Further, the various method and portions thereof, may be performed on one or more of the various computing devices, on a cloud, network-based server, on a local or remote user's computing device, and various combinations thereof.

It is also important to note with regard to FIG. 1 that the presented embodiment is just one of many possible applications on which the various T&M embodiments herein may be implemented.

Some embodiments of the system illustrated in FIG. 1 enable live mobile telecollaboration include a tracking and modeling core, which enables the system to synthesize views of the environment and thus decouple the remote user's viewpoint from that of the local user, giving the remote user some control over the viewpoint, and to register virtual annotations to their real world referents. Note however that this is a particular example application, and not all embodiments include virtual annotation, model viewing, or model navigation functionality.

This framework is compatible with hardware devices and systems that are already ubiquitous (e.g., smartphones), but also scales to more advanced high-end systems, including future virtual reality devices and systems and systems there between such as a personal computer. Further, some embodiments are compatible with various types of displays for the local user, including eye-worn, head-worn and/or projector-based displays.

In the illustrated embodiment of the FIG. 1, the local user may hold or wear a device that integrates a camera and a display system (e.g., hand-held tablet, mobile device, or other hardware with a camera), which is used to both sense the environment and display visual/spatial feedback from the remote user correctly registered to the real world. In the case of a hand-held device, the handheld device acts as sort of a "magic lens" (i.e., showing the live camera feed and virtual annotations, when the embodiment include augmented reality). Since a collaboration system typically aids the user an actual task being performed rather than distracts from it, an interface which is simple and easy to comprehend is typically provided such as to facilitate an active user who may be looking at and working in multiple areas.

A device of the remote user may also be a mobile device, such as a handheld computer, a tablet, a smartphone, and the like. However, the device of the remote user may also or alternatively be a personal computer, a wearable computing device, and the like. The remote user, in some embodiments, is presented with a view into the local user's environment, rendered from images obtained by the local user's camera. The remote user, in augmented reality embodiments, can place annotations that will be displayed to both users, correctly registered to their real-world referents from their respective points of view. Annotations may include point-based markers, more complex three-dimensional annotations, drawings, or live imagery, such as hand gestures.

In a simple embodiment, the remote user's viewpoint may be restricted to being identical to the local user's current camera view. In such embodiments, little image synthesis is needed. However, the remote user may be permitted be able to decouple a presented viewpoint and control the viewpoint independently, as far as supported by the available imagery of the environment. In such embodiments where the system allows for decoupled views, only the viewpoint is decoupled; the video is still synthesized and updated from live images to enable consistent communication.

Figure 2:
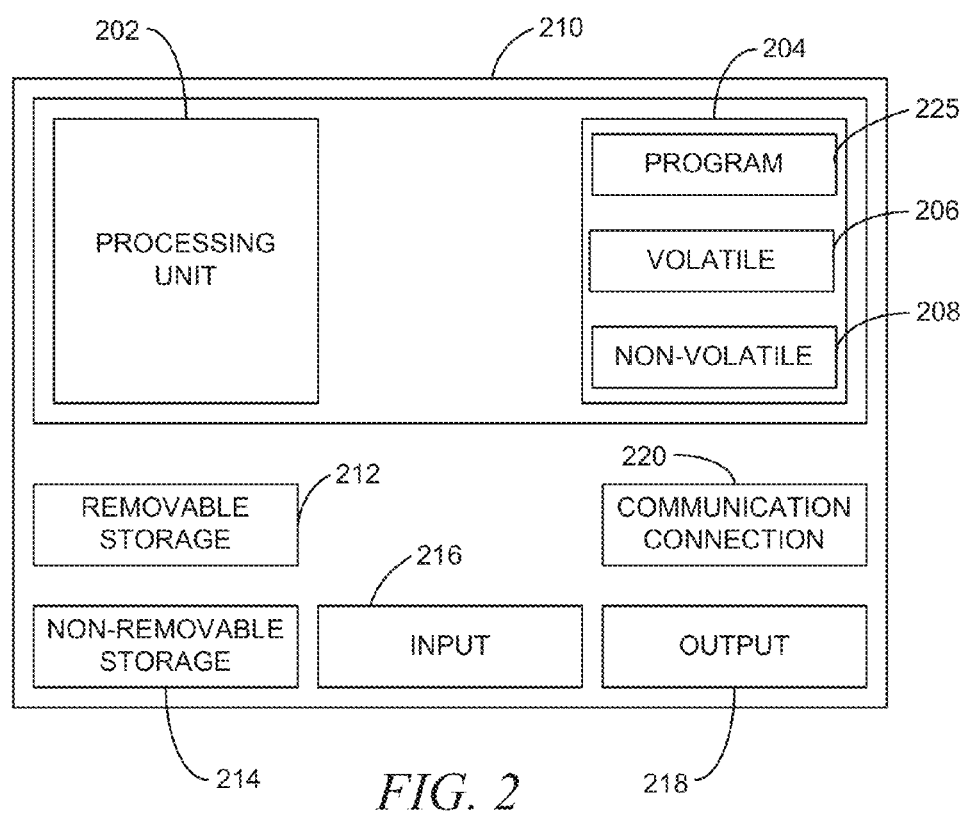
FIG. 2 is a block diagram of a computing device, according to an example embodiment.

FIG. 2 is a block diagram of a computing device, according to an example embodiment. The computing device of FIG. 2 may be implemented as one or more of the computing devices of the local user's interface, core system, and remote user's interface as illustrated and described with regard to FIG. 1.

In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 210, may include a processing unit 202, memory 204, removable storage 212, and non-removable storage 214. Although the example computing device is illustrated and described as computer 210, the computing device may be in different forms in different embodiments. For example, the computing device may instead be a smartphone, a tablet, smartwatch, another wearable computing device type, or other computing device including the same, similar, fewer, or more elements than illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, one or more cameras, mouse, keyboard, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium. In particular, FIG. 3 presents an overview of the operations of certain portions of some embodiments.

Figure 3:
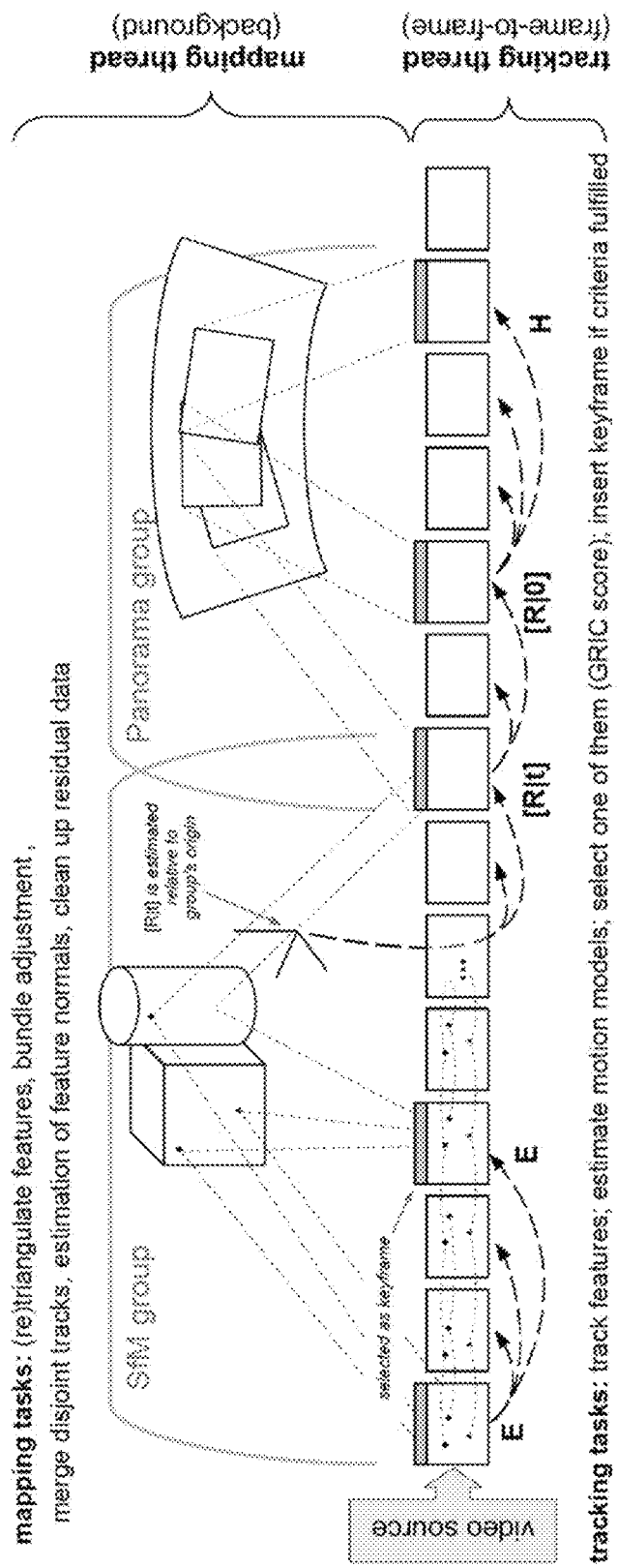
FIG. 3 illustrates feature tracking and motion estimation, according to an example embodiment.

FIG. 3 illustrates feature tracking and motion estimation, according to an example embodiment. More specifically, FIG. 3 illustrates keyframes and the splitting of tracking and mapping into two parallel threads. Keyframes are the frames that the mapping thread uses to build the model. Some embodiments may chose to select each frame as a keyframe, while other embodiments may select keyframes more sparsely, based on a set of criteria.

The split and design of the threads follows two general guidelines. First, the tracking thread should be as fast as possible and leave tasks that are not imminent in order for the next frame to be processed to the mapping thread, which in some embodiments, runs asynchronously in the background. Second, the first steps in the pipeline should not be dependent on the motion model (parallax-inducing versus rotation-only) that will be selected at least in part to minimize redundant computations.

The illustration of FIG. 3 presents a conceptual overview of the system's operation. Briefly summarized, the system operates with a tracking thread that receives a new frame and locates features. The features, which may be located via template-based matching in some embodiments, either stem from the previous frame or, if a map of the environment has already been built, were projected from the map into the frame. From these feature correspondences, estimates of both a model for parallax-inducing camera motion as well as a model for rotation-only motion can be calculated. A selection of the model that better represents the data via comparing their GRIC scores is then made. Under certain conditions, a keyframe may be inserted. Consecutive keyframes of the same kind (Structure from Motion "SfM" or panorama) are collected into a keyframe group. The mapping thread operates on these sets of collected keyframes and creates an appropriate environment model (SfM or panorama). These tracking and mapping threads are described in greater detail below.

With regard to the estimates of camera motion, conceptually, two two-view relations, namely the essential matrix (E) for parallax motion and the homography (H) for panoramic or rotational-type motion, are all-encompassing in that they describe all cases of camera movements that can occur in a static environment. Consequently, some embodiments may use only these two models. However, some embodiments may not make optimal use of the environment model that is built in the background; by sequentially estimating E from potentially small baselines, tracking remains relatively brittle and jittery.

Therefore, some embodiments include both two-view relations (for initialization, after tracking loss, or when rotating into uncharted territory) as well as two model-based absolute poses [R|t] and [R|0], or more precisely, [R|t]$_{prev}$* [R|(0, 0, 0)$^T$], where [R|t]$_{prev}$ is the (fixed) pose of the previous keyframe (whenever the camera observes a par of the environment for which a 3D model has been built). It should be noted that in some embodiments, in each frame, an estimate of only two models is made (the two-view relations or the absolute pose models; thus, the computational load has not increased).

The integration of absolute pose models may be performed for different reasons. For example, the integration of absolute pose models may be made because it allows distinguishing rotation-only movement from planar environments (which is difficult in the model-free case, since in both cases, the resulting transformations are described by the same relation, namely, a homography). Secondly, the integration of absolute pose models decreases the risk of fragmentation of the model into connected sub-maps of alternating types (which a linear sequence of E's and H's may produce), since the system can connect incoming frames directly to an existing model, rather than only to the previous keyframe.

Unlike in the case of E vs. H, when a model is available, the absolute pose [R|t] may be well-defined and can be estimated irrespective of the relative camera motion. Thus, it is less obvious why estimating [R|0] and the subsequent model selection step is performed in some embodiments. Some embodiments do so for the following reason: Consider a case where the camera observes a known scene using model-based tracking, then rotates towards unobserved parts of the scene. Due to the rotation-only movement, no new features can be triangulated. If [R|t] is the only model-based pose that is estimated, and has priority as long as enough triangulated features are visible, the system will switch to H only when very few, if any, of the existing features are left, risking tracking loss in between and generating a panorama that has very little overlap with the existing model. By estimating [R|0] and thus explicitly switching to panorama mode, such as if [R|0] proves to better represent the data, panorama building can begin immediately, ensuring that it is well-connected to the existing structure by the time the system switches to H, seamlessly continuing the panorama as it extends into newly observed parts of the scene.

Figure 4:
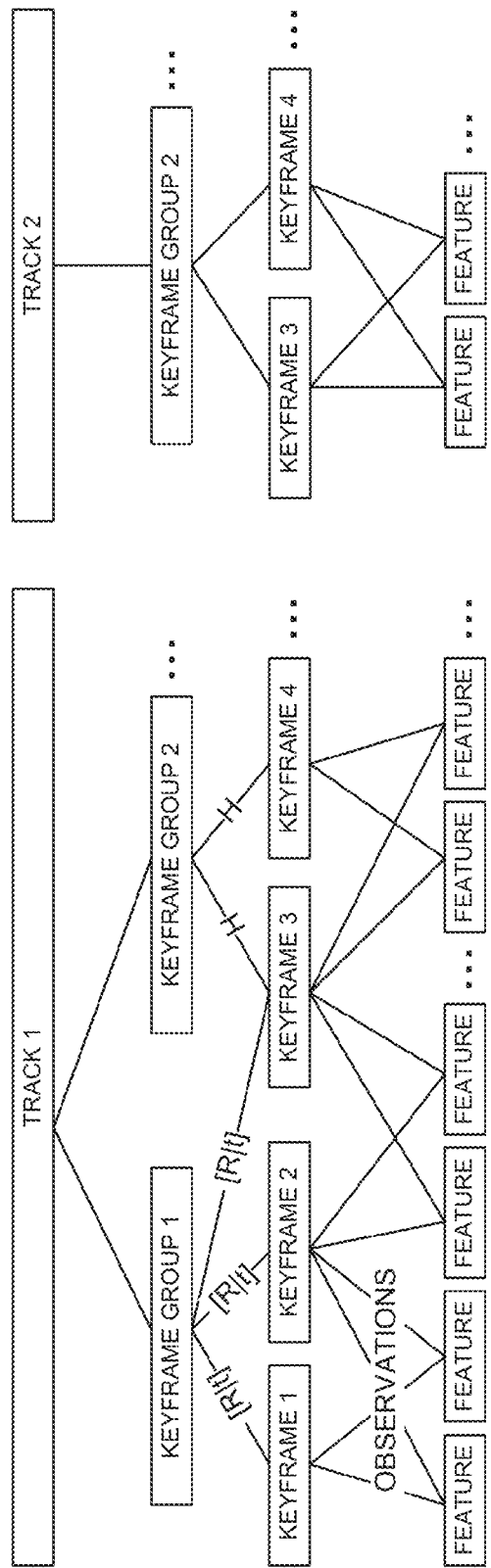
FIG. 4 illustrates a data structure, according to an example embodiment.

As tracks are created and models built therefore, the data may be stored in one or more data structures. FIG. 4 illustrates such a data structure, according to an example embodiment.

FIG. 4 visualizes the main data objects of some embodiment that store the current system state and the emerging map as well as their relations. The most central element of the data structure of FIG. 4 in such embodiments is the keyframe group: each keyframe group governs one sub-map consisting of a set of keyframes that are either all linked by 3D pose information (SfM group) or all linked by homographies (panorama group). The keyframe group also determines the frame of reference, with respect to which all pose information is stored. A keyframe may be part of a panorama group as well as a SfM group (e.g., keyframe 3 in FIG. 4), in which case it is assigned a pose in both groups. The set of keyframes and keyframe groups can be thought of as a graph. Initially, this graph of such embodiment may be linear, consisting of a chain of E's and H's modeling the (linear) video stream. As soon as the system has built a model of the environment and is using model-based tracking however, new keyframes are linked directly to the model, creating a branching graph. When tracking is lost, all links to the current map are lost, and the tracker starts a new track. Initially, the new track is completely unconnected to the previous data, but can later be merged if there is some overlap discovered from what is observed during both tracks as described further below.

Figure 5:
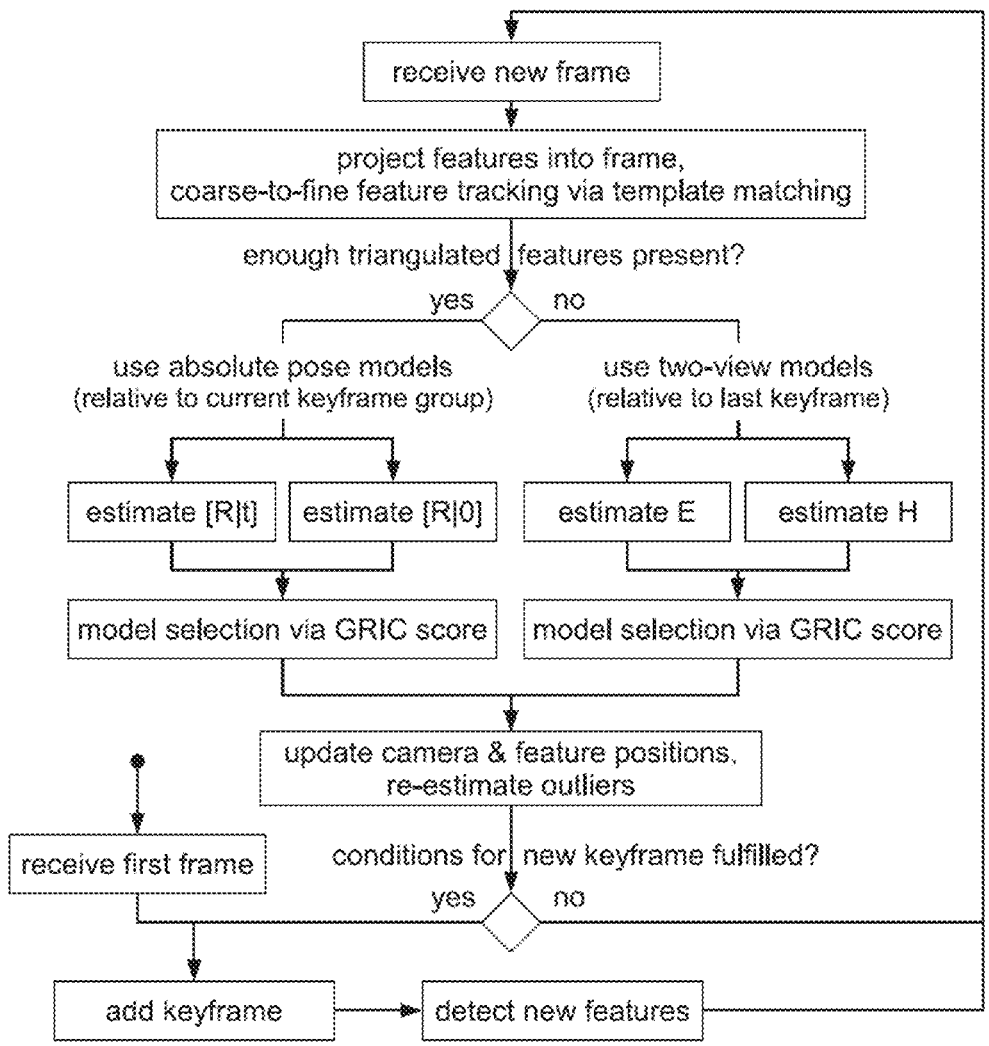
FIG. 5 is a block flow diagram of a method, according to an example embodiment.

Turning now to tracking, FIG. 5 is a block flow diagram of a method, according to an example embodiment. In particular, FIG. 5 presents a flowchart of the tracking thread according to an example embodiment.

In some embodiments, when a new keyframe is added, new keypoints are detected using an image feature detector, such as the FAST corner detector, in all areas not already covered by keypoints. This enforces a spatially well-distributed set of keypoints, which improves tracking robustness by overlaying a simple rectangular grid over the image and selecting the strongest keypoint in each cell.

In some embodiments, to project existing features into the frame and predict their appearance, as much information about the feature as possible is used. That is, when the 3D position and normal estimate of the feature are available, it is sampled from the original keyframe using a fully qualified homography representing a 3D plane rotation. If only the 2D location of the feature is known, the patch is sampled in 2D.

Frame-to-frame feature correspondences are created in some embodiments using a multi-level (i.e., coarse-to-fine), active search patch tracker with Normalized Cross-Correlation (NCC)-based template matching. On the full-resolution image, the feature location may be refined to subpixel accuracy by using a quadratic fit to neighboring scores.

The multilevel tracking is executed in some embodiments on a per-feature basis instead of interleaved with the pose estimation, since it is not known which type of camera motion to expect, and thus which model to enforce, until after the tracking step.

In some embodiments, after features are located on the full-resolution image, the motion model is estimated. If a 3D model of the observed scene is available, that is, there exists a SfM group that contains sufficiently many of the successfully tracked features, some embodiments estimate [R|t] and [R|0] using iterative gradient descent of an M-estimator (cf. Table 1 bottom). Otherwise, some embodiments may instead estimate both a homography H and an essential matrix E between the previous keyframe and the current frame using Maximum A Posteriori Sample Consensus, or MAPSAC (cf. Table 1 top).

TABLE 1

Estimation algorithms for the four models. In some embodiments, in each frame, only two models are estimated.

| Model | Estimation Algorithm |
| --- | --- |
| Essential Matrix E | MAPSAC with five-point algorithm |
| Homography H | MAPSAC |
| Abs. pose [R|t] | Gradient descent with M-estimator |
| Abs. Orientation [R|0] | Gradient descent with M-estimator |

In some embodiments, the probability density function that is assumed for inliers and outliers is part of the model selection process of some embodiment. In some such embodiments, a common assumption that inliers are distributed normally with measurement error a, and outliers are distributed uniformly across the search region. Thus, after model estimation, the measurement error $\sigma$ and inlier ratio $\gamma$, which may be utilized with regard to the model selection step, may be estimated using expectation-maximization.

In some embodiments, the GRIC score is then computed for both models, and the better model (i.e., the one with lower GRIC score) is selected. When E is determined to be the better fit, it is decomposed in some embodiments into a relative pose $[R|t]_{rel}$.

In some embodiments, in an attempt to retain individual features as long as possible, outliers are re-estimated after the model selection. This may be trivial in the cases of H, [R|t], and [R|0], since the model defines a unique mapping for each point. In the case of E, each outlier may be re-estimated by running the NCC-based template matching again on a thin rectangular matching area that was rotated to align with the epipolar line. Features that prove unreliable (i.e., that repeatedly are outliers and need to be re-estimated) may be removed.

The current frame may then be added as a new keyframe $k_{new}$ in some embodiments when several conditions are met. These conditions may include: (1) tracking quality, as determined by the fraction of inliers that MAPSAC finds; (2) time since the last keyframe insertion; (3) in the case of rotation-only motion (H and [R|0]), the median 2D distance that the keypoints "traveled" since the last keyframe, and in the case of parallax-inducing motion (E and [R|t]), the median feature triangulation angle.

If the estimated motion model connects $k_{new}$ to an existing keyframe group of the respective type (i.e., a SfM group for E or [R|t], and a panorama group for H or [R|0]), $k_{new}$ may be merged into the existing group.

Otherwise, a new keyframe group including $k_{new}$ and the previous keyframe $k_{prev}$ may be created. Insertion of a new group, in some embodiments, marks the beginning of a new sub-map, but it does not invalidate any of the existing map data: particularly during model-based tracking, where both feature and camera positions are known in 3D, the tracker can still refer to all currently registered features and project them into incoming frames. Note that a switch from [R|0] to [R|t] does not cause creation of a new SfM group: coming from [R|0] implies that 3D features are visible and thus that there is an SfM group to which the new keyframe is connected even after intermittent rotation-only motion.

Lastly, new features are detected in all uncovered image regions by applying the same grid as in the first frame and choosing new features for each cell that is not covered by currently tracked features.

In some embodiments, essential matrices may be merged. For example, while E may be decomposed into relative pose information $[R_{rel}|t_{rel}]$ between the new frame and the previous keyframe $k_{prev}$, the scale of $t_{rel}$ is arbitrary. Before it can be integrated into an existing SfM group, in some embodiments, a common scale has to be found. In order to do so, the set of all features that have been observed, and thus have a triangulated position, may be used in both the existing SfM group as well as with respect to $[R_{rel}|t_{rel}]$, and calculate the ratios of their distances to $k_{prev}$ in both coordinate systems. The median of those ratios may then be taken as a robust measure of the scale between the two coordinate systems and scale $t_{rel}$ accordingly.

In some embodiments, when tracking gets lost, such as when the number of inliers for the selected model falls below a set threshold, the standard strategy employed by most T&M systems is to continuously try to relocalize the camera with respect to the current map with each new frame until successful. However, this means that tracking and mapping are suspended and no data is collected until relocalization is successful. The various embodiments herein instead may employ an alternative strategy. For example, instead of trying to relocalize, a new track is started immediately and it is left to the background mapping thread to merge tracks where possible. This allows the system in such embodiments to continue collecting data even after tracking failure occurs, and, if the tracks are later found to overlap, merges the created maps. If they do not overlap, the maps remain separate. Note that in this case, a recovery-based system would never recover.

Turning now to the mapping and in particular the mapping thread, in some embodiments, the mapping thread runs independently, asynchronously, and parallel to the tracking thread. The mapping thread, in some embodiments, is responsible for some or all of the following tasks:

1) triangulate new features,
2) run bundle adjustment,
3) merge disjoint tracks,
4) estimate feature normals, and
5) clean up residual data.

These tasks may be allowed to be more computationally intensive than the tracker's tasks, since the system does not depend on them in order to process the next frame.

Bundle adjustment refers to an algorithm that refines a set of 3D feature positions and a set of camera (keyframe) positions and/or orientations in which these features were observed such that an error metric (such as the projection errors) is reduced via an optimization process.

Each of the tasks may be assigned a priority that may depend on one or both of the time it was last executed and the system's current state. In each iteration, the task with highest priority is executed. For example, after a new keyframe is inserted, triangulation of new features becomes important. If tracking is lost and thus a new track is started, merging of tracks may be prioritized to enable quicker merging of tracks. Thus, assuming that the two threads run, i.e., the tracking and mapping threads, on two independent processing cores of a computer processor or on two distinct processors, the latter may happen as quickly as conventional relocalization in some such embodiments.

In some embodiments, a feature observed in at least two keyframes within the same SfM group, but has not been bundle adjusted, is triangulated and is assigned a 3D location with respect to this group's frame of reference. When the tracker adds a new keyframe with a new observation of a feature f, f may be retriangulated using all information when the mapper cycles through this step the next time.

In some embodiments, SfM groups with at least three keyframes are passed through a standard bundle adjuster that globally optimizes all keyframe (i.e., camera) poses and feature positions in the group's frame of reference. When there are multiple such groups, the group with the newest keyframe, that is, the keyframe adjusted the least number of times, may be processed.

More sophisticated bundle adjustment strategies with local and global adjustment steps are also integrated in some embodiments.

When tracking is lost, the tracker of some embodiments immediately starts a new, independent track, rather than continuously trying to relocalize with respect to the existing map. In doing so, the tracker continues to collect and "stitch together" data even though the spatial relation to the first map is initially unknown.

In some embodiments, disjoined tracks may be considered for merger to form a single track. In one such embodiment, whenever a new keyframe is taken, the system stores a down-sampled, blurred copy of the image, dubbed a Small Blurry Image (SBI).

Merging of tracks in such embodiments then follows. The track merging of such embodiments includes choosing a keyframe $k_1$ and computing a normalized cross-correlation (NCC) of its SBI with the SBI of all other keyframes. Keyframes on the same track as $k_1$ are omitted, as are keyframes to which a previous merge attempt failed. The keyframe $k_2$ with the highest NCC score is selected, and the SBIs of $k_1$ and $k_2$ are aligned to each other using inverse compositional image alignment [2] of an affine homography $H_A$.

The features of $k_1$ are then projected into $k_2$ using $H_A$, and a regular "tracking" step may be executed.

In some embodiments, when the tracking step fails, $k_2$ is "blacklisted" in $k_1$ as a failed attempt such that the algorithm does not attempt the same combination again, and $k_1$ stores a timestamp of when this merge attempt occurred. The next time the algorithm tries to merge tracks in such embodiments, the keyframe that has not been chosen as $k_1$ the longest period is chosen as $k_1$.

When the tracking step succeeds in estimating a model that is supported by a sufficient fraction of feature correspondences in such embodiments, the two tracks are considered successfully merged. Several different cases are considered in various embodiments in actually merging the environment models, depending on the type of transition connecting the two tracks, and whether or not $k_1$ and $k_2$ are already part of a keyframe group of the respective type. If available, a transition is preferred that would not introduce a new keyframe group. For example, if $k_1$ and $k_2$ are both part of a panorama group, and could be connected with either H or E, H is preferred. Adding of a group, if needed, as well as merging of panorama groups is straightforward such that the latter only requires concatenating the homographies accordingly. To merge SfM groups, features that are observed in both groups are utilized. To generate features, the features that connect $k_1$ and $k_2$ one frame into $k_2$'s group via epipolar search are tracked. Then, a common scale is computed as described above.

In some embodiments, to properly predict a feature's appearance from an assumed camera pose, the feature's 3D position and its local structure may be determined. Assuming that sufficiently many features are located on locally approximately planar surfaces, this structure can be defined by a normal vector n, and the change in appearance between two views of the feature is given by a homography $H\perp$, which can be expressed in terms of n, the relative camera pose $[R_{rel}|t_{rel}]$, and the feature's 3D position x:

$$H_\perp = R_{rel} + \frac{t_{rel} \cdot n^T}{n^T x} \Leftrightarrow H_\perp = R_{rel}(n^T x \cdot I_{3 \times 3} + t_{rel} \cdot n^T) \qquad (1)$$

Note that $H\perp$ is a homogeneous quantity, i.e., its scale is arbitrary.) The two views will be reasonably similar, as otherwise the tracker would have failed to locate the feature. Yet, small differences between them allow estimation of $H\perp$ and thus n using image alignment.

In some embodiments, if n is assumed to be the only unknown, $H\perp$ has only two degrees of freedom, and it is possible to parameterize it accordingly. However, noise in other variables will cause the projections to fail to coincide precisely, such that allowance for at least two additional degrees of freedom for shift should be provided. Some embodiments utilize an affine homography with a straightforward six-degree-of-freedom parametrization, which is used in a standard inverse-compositional image alignment framework, and afterwards extracting n from the overdetermined system given by Eq. (1) using singular value decomposition.

Executing the image alignment step for each feature is a fairly expensive process. However, it should be noted that the image alignment step can be run feature-by-feature in the background and is highly parallelizable, and none of the other steps are immediately dependent on it. Further, while no normal estimate is available, the tracker will typically continue to use a 2D projection of the feature.

To maintain and refine the normal vector n over time, instead of feeding it through a Kalman filter, some embodiments simply collect independent estimates of n from random pairs of views, the average of which is taken as the currently assumed value of n. This allows elastic adaptation to the amount of processing power available. For well-textured and indeed planar features, the set of estimates is typically highly consistent, while less textured and highly non-planar features may cause the image alignment to fail to converge or produce a set of wildly diverging estimates.

If observed data may have arisen from several different models, problem arises of selecting the right model in addition to the common problem of estimating the model parameters. Model selection is a complex problem in particular if the models in question are of fundamentally different kind, as is the case here: a homography is a bijective 2D map, and thus the observed residual between an estimated and measured feature location is two-dimensional, whereas the essential matrix maps a 2D point to a line in 2D, and thus the residual is one-dimensional (perpendicular to the line). This is analogous to trying to determine whether an observed set of 2D points can best be represented by a point or a line. It becomes apparent that residuals alone are not sufficient to select the model.

For this reason, several different metrics have been proposed in related literature and various metrics may be utilized in various embodiments. For instance, some embodiments utilize the Bayesian formulation of the "Geometric Robust Information Criterion" (GRIC), which is based on the Bayesian probability that a given model generated the observed data. The following first describes the GRIC score for the case of the two-view relations E and H, then its application to the estimation of the absolute poses [R|t] and [R|0]. In the following, the same notation and variable names are used as set for by P. Torr (P. Torr, "Bayesian model estimation and selection for epipolar geometry and generic manifold fitting," Int'l Journal of Computer Vision, vol. 50, no. 1, pp. 35-61, 2002). Further, the subscript m is used to indicate that a quantity is dependent on the models that are being compared. log(x) denotes the natural logarithm.

The generic formula of Torr's Bayesian GRIC score is:

$$GRIC_m = -2L_{MAP,m} k_m \log n \quad (2)$$

where $k_m$ is the number of parameters of the model, n is the number of observations, and $L_{MAP,m}$ denotes the maximum a-posteriori log likelihood of model m given the data, which is based on the probability density functions (PDFs) that the data are assumed to stem from. Note that the GRIC score is a cost function, i.e., lower score indicates better model fit.

For the problem at hand, some embodiments assume a mixture of inliers affected by Gaussian noise, and outliers sprinkled uniformly in the search region. Specifically:

$$L_{MAP,m} = \sum_i [\log(\gamma_i \cdot p_{in} + (1 + \gamma_i) \cdot p_{out}]) \text{ with} \quad (3)$$

-continued $$p_{in} = \frac{\sqrt{2\pi\sigma^2}^{d_m - D}}{c_m} \cdot \exp\left(-\frac{e_{i,m}^2}{2\sigma^2}\right), \quad (4)$$

$$p_{out} = 1/v \quad (5)$$

$\gamma_i \in \{1, 0\}$ indicates if correspondence i is an inlier, $e_{i,m}$ are the individual reprojection errors, $\sigma$ is their standard deviation, D is the dimensionality of each datum (here: a pair of 2D points, i.e., D=4), $d_m$ is the dimensionality of the model manifold, $D-d_m$ is the dimensionality of the error (for H, $D-d_m=2$, while for E, $D-d_m=1$ (perpendicular to the epipolar constraint)), and $C_m$ and $v$ are the volumes of the spaces from which inliers and outliers, respectively, arise.

Let $\gamma$ denote the expected inlier ratio $E(\gamma_i)$, and maximize over $\gamma_i$:

$$\Rightarrow GRIC_m = -2 \sum_i \log(\max\{\gamma \cdot p_{in}; (1-\gamma)p_{out}\}) + k_m \log n = \quad (6)$$

$$\sum_i \min\{\underbrace{-2\log(\gamma \cdot p_{in})}_{(*)}; \underbrace{-2\log((1-\gamma)p_{out})}_{(**)}\} + k_m \log n$$

$$(*) = -2\log\left(\gamma \frac{\sqrt{2\pi\sigma^2}^{d_m - D}}{c_m} \cdot \exp\left(-\frac{e_{i,m}^2}{2\sigma^2}\right)\right) \quad (7)$$

$$= \frac{e_{i,m}^2}{\sigma^2} + (D - d_m)\log 2\pi\sigma^2 + 2\log\frac{c_m}{\gamma} \quad (8)$$

$$(**) = -2\log\left(\frac{1-\gamma}{v}\right) = T_m + (D - d_m)\log 2\pi\sigma^2 + 2\log\frac{c_m}{\gamma} \text{ where} \quad (9)$$

$$= T_m + (D - d_m)\log 2\pi\sigma^2 + 2\log\frac{c_m}{\gamma} \text{ where} \quad (10)$$

$$T_m = 2\log\left(\frac{\gamma}{1-\gamma} \cdot \frac{v}{c_m}\right) - (D - d_m)\log 2\pi\sigma^2. \quad (11)$$

Thus, the final formula is given by:

$$GRIC_m = \sum_i \rho_2\left(\frac{e_{i,m}^2}{\sigma^2}\right) + n\left((D - d_m)\log 2\pi\sigma^2 + 2\log\frac{c_m}{\gamma}\right) + k_m \log n \quad (12)$$

with $\rho_2(x) = \min\{x, T_m\}$.

TABLE 2

GRIC score parameters for the four models considered in some embodiments. L × L is the area of one camera frame, S × S is the area of the constrained search region, Δ is the range of disparity.

| Model m | $k_m$ | $D - d_m$ | $c_m$ | v |
|---|---|---|---|---|
| E | 5 | 1 | L × L × Δ | L × L × S × S |
| H | 8 | 2 | L × L | L × L × S × S |
| [R\|t] | 6 | 2 | V | V × S × S |
| [R\|0] | 3 | 2 | V | V × S × S |

It should be noted that the formula herein differs from that given by Torr, as cited above, even though both are based on PDFs of the form of Eqs. (4) and (5). The difference is that in Torr's formula, it is assumed that the inliers are uniformly distributed in disparity across the entire search region, i.e., Δ=S (Δ and S are contained in $c_m$ and v, cf. Table 2). For large search areas, in some embodiments, this is not the case. Instead, the search region is large because tracking is to be robust to fast camera movement (including camera rotations), but it is also expected the (2D) movement of all features are strongly correlated. Further, the range of disparity $\Delta$ is still likely to be only a few pixels. Thus, setting $\Delta=S$ causes the log likelihood for E to decrease, because the observations do not match the model's assumption, and creates a significant bias towards selecting H. Hence, to alleviate this bias, $\Delta$ is kept independent of S.

As previously mentioned, GRIC scores are also used in some embodiments with regard to absolute pose models. With appropriate model-specific parameters as given in Table 2, Eqs. (11) and (12) are applicable to [R|0] and [R|t] as well, since the PDFs on which they are based follow the shape of Eqs. (4) and (5). Arguably, this case is actually less complex than the two-view relation case, since the dimension of the error $D-d_m$ is the same for both models (see Table 2).

Two aspects are worth noting: First, in analogy to the two-view case, $c_m$ and v are defined as the volumes of the spaces from which observations arise. This appears to necessitate to define the "volume" V of the 3D model, and to raise the question whether one assumes it to be part of the noisy estimation process, or in comparison with the current measurement error, to be noise-free. However, a look at the GRIC score equations (Eqs. (11) and (12)) and Table 2 reveals that, in the comparison of [R|t] vs. [R|0], only the quotient $c_m=v$ and difference $D-d_m$ are needed, and the values of V and D fall out as constant terms.

Second, in the case of E versus H, one parameter to the GRIC score is the range of disparity $\Delta$ expected for E. Conveniently, this parameter gives some control over how the process handles motions that are very close to rotation-only, i.e., have a very small baseline and thus very little parallax: the bigger $\Delta$, the more likely H is selected in those cases.

When comparing [R|t] and [R|0], this free parameter does not exist: all features are mapped to a unique image point. Further, especially for a good model and slow camera motion, the measurement noise $\sigma$ becomes very small, and it can be observed that consequently, the GRIC score becomes extremely accurate in discerning even small shifts in baseline. Thus, [R|0] is rarely selected, despite the smaller value of $k_m$, which gives is a slight advantage in case of close-to-equal error sums. Probabilistically, this makes perfect sense as the likelihood for $\|t\|$ exactly equal to 0 is virtually non-existent, and whenever the error distribution hints to even the slightest shift, [R|t] should be selected.

Practically, however, motions with very small t—imagine a camera mounted on a tripod with the optical center and the rotation axis in slight misalignment—are arguably better modeled as a panorama. For a panorama, a small shift of the optical center causes minor distortion artifacts, but rarely fatal harm to tracking and mapping. For structure-from-motion, it results in features with unreliable depth estimates from extremely ill-conditioned triangulations, and, as soon as only those features are visible, likely tracking failure.

Therefore, various embodiments adapt the model that is estimated as follows: instead of estimating [R|0], [R|t≤$t_{max}$] is estimated, more precisely, [R|t]$_{prev}$*[R|t]|‖t‖≤$t_{max}$). Practically, some embodiments implement this by estimating [R|t], but constraining ‖t‖ to [0; $t_{max}$] after each gradient descent iteration. $t_{max}$ can be understood as a soft threshold regulating how much baseline shift the system shall observe before preferring [R|t] over [R|0], analogous to $\Delta$ for E vs. H. By dividing by the distance to the environment, which is available, since this is in the model-based condition), $t_{max}$ can be transformed into a scale-independent feature observation angle $\alpha_{max}$, which is used in some embodiments as an input parameter to the system.

Figure 6:
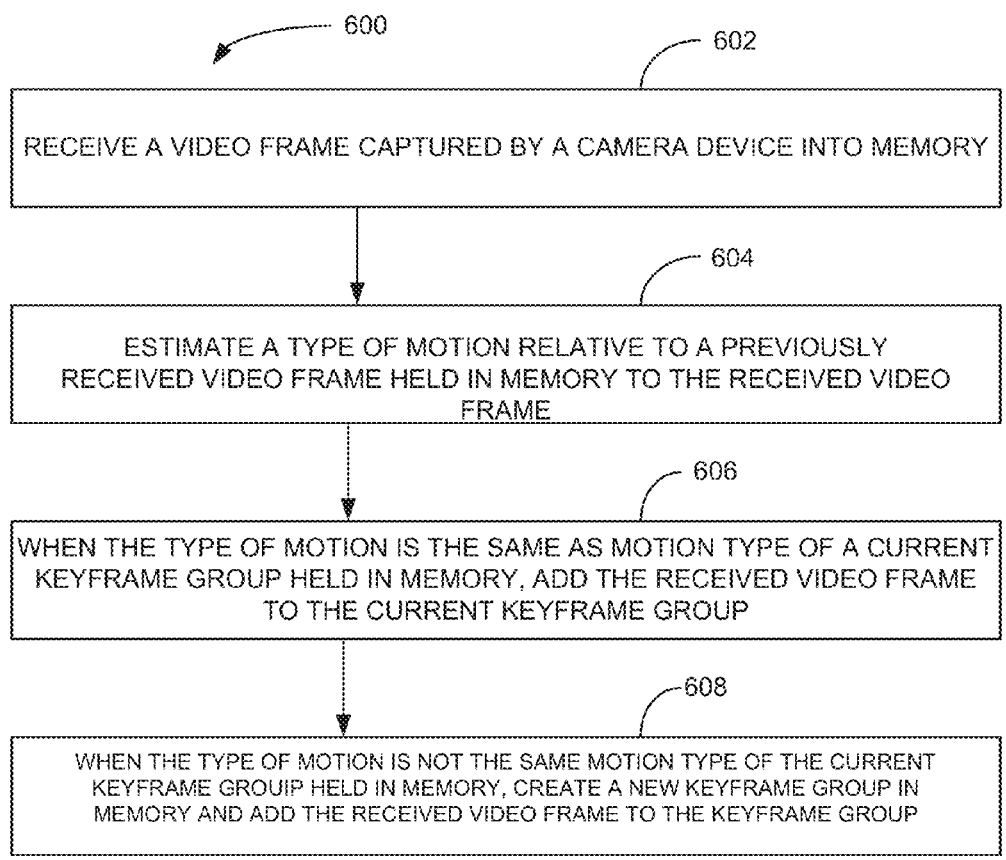
FIG. 6 is a block flow diagram of a method, according to an example embodiment.

FIG. 6 is a block flow diagram of a method 600, according to an example embodiment. The method 600 is an example of a method of some embodiments for performing tracking on received video frames. In some embodiments, the method 600 is performed on a computing device of a user local to a scene where the video frames are captured. In other embodiments, the method 600 is performed on a computing device of a remote user that receives the video frames from a local user via a network, such as the Internet. In yet other embodiments, the method may be performed on a networked server that receives the video frames via a network, such as the Internet.

The method includes receiving 602 a video frame captured by a camera device into memory and estimating 604 a type of motion relative to a previously received video frame held in memory to the received video frame. When the type of motion is the same as motion type of a current keyframe group held in memory, the method 600 includes adding 606 the received video frame to the current keyframe group. Conversely, when the type of motion is not the same motion type of the current keyframe group held in memory, the method 600 includes creating 608 a new keyframe group in memory and adding the received video frame to the new keyframe group. In some embodiments, there may be multiple current keyframe groups, and a new keyframe may be added to any one of those, depending on the estimated motion type.

In some embodiments, after receipt 602 of the video frame and prior to estimating 604 the type of motion, the method 600 includes identifying features in the received video frame. In some such embodiments, the features are identified by a corner detector algorithm.

Others of such embodiments may include estimating 604 the type of motion from the previously received video frame to the received video frame includes estimating the respective motion type for each of at least two motion types and applying a metric, such as a modified GRIC scoring metric, modified as discussed above, to each of the at least two estimated motion types. The method 600 may then select a motion type that represents motion from the previously received video frame to the received video frame. The at least two motion types in some embodiments are parallax-inducing motion and rotation-only motion.

Figure 7:
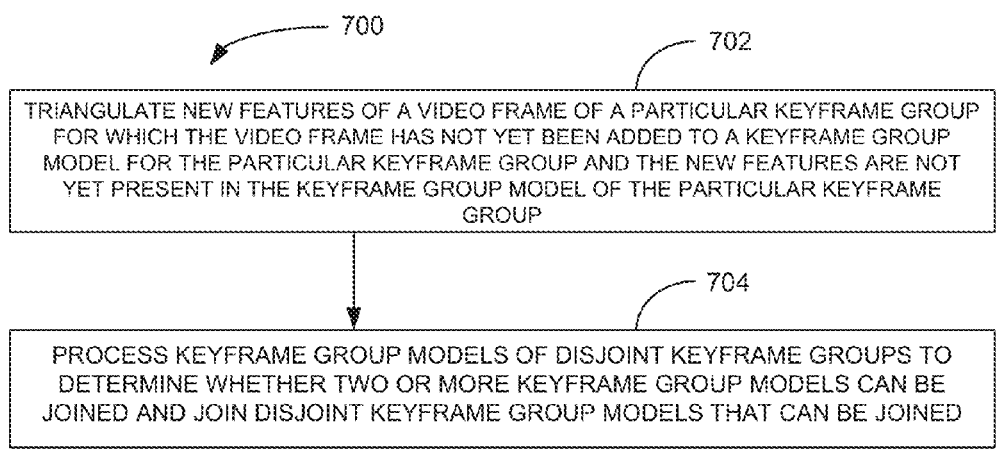
FIG. 7 is a block flow diagram of a method, according to an example embodiment.

FIG. 7 is a block flow diagram of a method 700, according to an example embodiment. The method 700 is an extension of some embodiments of the method 700 and it is generally performed to build models from received 602 video frames.

The method 700 includes executing a modeling process against data of each of one or more keyframe groups held in memory to generate and maintain keyframe group models held in memory. The modeling process includes triangulating 702 new features of a video frame of a particular keyframe group for which the video frame has not yet been added to a keyframe group model for the particular keyframe group and the new features are not yet present in the keyframe group model of the particular keyframe group. The method 700 further includes processing 704 keyframe group models of disjoint keyframe groups to determine whether two or more keyframe group models can be joined and joining disjoint keyframe groups that can be joined. As models are formed and augmented, the method 700 may further include transmitting all or a portion of a model over a network to at least one other computing device.

Another embodiment is in the form of a system, such as a mobile computing device. The system of this embodiment includes at least one processor, and at least one memory. The at least one memory stores an instruction set that is executable by the at least one processor to perform data processing activities. The data processing activities include executing a tracking process including receiving a video frame into the at least one memory and estimating a type of motion from a previously received video frame held in the at least one memory to the received video frame. When the type of motion is the same as motion type of a current keyframe group held in the at least one memory, the data processing activities include adding the received video frame to the current keyframe group. When the type of motion is not the same motion type of the current keyframe group, the data processing activities for some embodiments may include creating a new keyframe group in the at least one memory and adding the received video frame to the new keyframe group.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving a video frame captured by a camera device into memory;
   estimating a type of motion relative to a previously received video frame held in memory to the received video frame, the estimating of the type of motion including:
      for each of at least two motion types, estimating the respective motion type;
      applying a metric to each of the at least two estimated motion types; and
      selecting a motion type that represents motion from the previously received video frame to the received video frame;
   when the type of motion is the same as motion type of a current keyframe group held in memory, adding the received video frame to the current keyframe group; and
   when the type of motion is not the same motion type of the current keyframe group held in memory, creating a new keyframe group in memory and adding the received video frame to the new keyframe group.

2. The method of claim 1, wherein after receipt of the video frame and prior to estimating the type of motion, the method further comprising:
   identifying features in the received video frame.

3. The method of claim 2, wherein features are identified according to a corner detector algorithm.

4. The method of claim 1, wherein the at least two motion types are parallax-inducing motion and rotation-only motion.

5. The method of claim 1, wherein the metric applied to each of the at least two estimated motion types is a modified Geometric Robust Information Criterion metric.

6. The method of claim 1, further comprising:
   executing a modeling process against keyframe group data of each of one or more keyframe groups held in memory to generate and maintain keyframe group models held in memory, the modeling process including:
      triangulating new features of a video frame of a particular keyframe group for which the video frame has not yet been added to a keyframe group model for the particular keyframe group and the new features are not yet present in the keyframe group model of the particular keyframe group; and
      processing keyframe group models of disjoint keyframe groups to determine whether two or more keyframe group models can be joined and joining disjoint keyframe group models that can be joined.

7. The method of claim 6, wherein the video frame captured by the camera device into memory is captured by a camera and into a memory of a first computing device, the method further comprising:
   transmitting at least a portion of at least one keyframe group model held in memory via a network interface device over a network to at least one second computing device.

8. The method of claim 7, further comprising:
   receiving, via the network interface device from the network, annotation data including data identifying a location within an identified keyframe group model held in memory; and
   adding the annotation data to the identified keyframe group model, the annotation data presentable within a view presented on a display of the first computing device when the view includes the location identified in the received annotation data.

9. A non-transitory computer readable medium, with instructions stored thereon, which when executed by the at least one processor cause a computing device to perform data processing activities, the data processing activities comprising:
   receiving a video frame captured by a camera device into memory;
   identifying features in the received video frame;
   estimating a type of motion from a previously received video frame held in memory to the received video frame;
   when the type of motion is the same as motion type of a current keyframe group held in memory, adding the received video frame to the current keyframe group;
   when the type of motion is not the same motion type of the current keyframe group held in memory, creating a new keyframe group in memory and adding the received video frame to the new keyframe group; and
   executing a modeling process against keyframe group data of each of one or more keyframe groups held in memory to generate and maintain keyframe group models held in memory, the modeling process including:
      triangulating new features of a video frame of a particular keyframe group for which the video frame has not yet been added to a keyframe group model for the particular keyframe group and the new features are not yet present in the keyframe group model of the particular keyframe group; and
      processing keyframe group models of disjoint keyframe groups to determine whether two or more keyframe group models can be joined and joining disjoint keyframe group models that can be joined.

10. The non-transitory computer readable medium of claim 9, wherein features are identified according to a corner detector algorithm.

11. The non-transitory computer readable medium of claim 9, wherein estimating the type of motion from the previously received video frame to the received video frame includes:

for each of at least two motion types, estimating the respective motion type;

applying a metric to each of the at least two estimated motion types; and selecting a motion type that represents motion from the previously received video frame to the received video frame.

12. The non-transitory computer readable medium of claim 11, wherein the at least two motion types are parallax-inducing motion and rotation-only motion.

13. The non-transitory computer readable medium of claim 11, wherein the metric applied to each of the at least two estimated motion types is a modified Geometric Robust Information Criterion metric.

14. The non-transitory computer readable medium of claim 9, wherein the video frame captured by the camera device into memory is captured by a camera of and into a memory of a first computing device, the data processing activities further comprising:

transmitting at least a portion of at least one keyframe group model held in memory via a network interface device over a network to at least one second computing device;

receiving, via the network interface device from the network, annotation data including data identifying a location within an identified keyframe group model held in memory; and adding the annotation data to the identified keyframe group model, the annotation data presentable within a view presented on a display of the first computing device when the view includes the location identified in the received annotation data.

15. A device comprising:

at least one processor;

at least one memory; and an instruction set, stored in the at least one memory and executable by the at least one processor to perform data processing activities, the data processing activities comprising:

executing a tracking process including:

receiving a video frame into the at least one memory;

estimating a type of motion from a previously received video frame held in the at least one memory to the received video frame, the estimating including:

for each of at least parallax-inducing motion and rotation-only motion types, estimating the respective motion type;

applying a modified Geometric Robust Information Criterion metric to each of the estimated motion types; and selecting a motion type that represents motion from the previously received video frame to the received video frame;

when the type of motion is the same as motion type of a current keyframe group held in the at least one memory, adding the received video frame to the current keyframe group; and when the type of motion is not the same motion type of the current keyframe group, creating a new keyframe group in the at least one memory and adding the received video frame to the new keyframe group.

16. The device of claim 15, wherein after receipt of the video frame and prior to estimating the type of motion, the data processing activities further comprising:

identifying features in the received video frame according to a corner detector algorithm.

17. The device of claim 15, the data processing activities further comprising:

executing a modeling process in one or more processing threads distinct from one or more processing thread in which the tracking process is executed, the modeling process executed against keyframe group data of each of one or more keyframe groups held in the at least one memory to generate and maintain keyframe group models held in the at least one memory, the modeling process including:

triangulating new features of a video frame of a particular keyframe group for which the video frame has not yet been added to a keyframe group model for the particular keyframe group and the new features are not yet present in the keyframe group model of the particular keyframe group; and processing keyframe group models of disjoint keyframe groups to determine whether two or more keyframe group models can be joined and joining disjoint keyframe group models that can be joined.

* * * * *